United States Patent
Lee et al.

(10) Patent No.: US 9,112,600 B2
(45) Date of Patent: Aug. 18, 2015

(54) WAVELENGTH TUNING TIME MEASUREMENT APPARATUS AND METHOD FOR MULTI-WAVELENGTH PASSIVE OPTICAL NETWORK

(71) Applicant: Electronics and Telecommunications Research Institute, Daejeon-si (KR)

(72) Inventors: Jie-Hyun Lee, Daejeon-si (KR); Seung-Il Myong, Daejeon-si (KR); Han-Hyub Lee, Daejeon-si (KR); Sang-Soo Lee, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 281 days.

(21) Appl. No.: 13/866,647

(22) Filed: Apr. 19, 2013

(65) Prior Publication Data
US 2013/0302029 A1 Nov. 14, 2013

(30) Foreign Application Priority Data

Apr. 20, 2012 (KR) .................. 10-2012-0041782
Apr. 20, 2012 (KR) .................. 10-2012-0041792
Apr. 18, 2013 (KR) .................. 10-2013-0043186

(51) Int. Cl.
- *H04B 10/00* (2013.01)
- *H04B 10/07* (2013.01)
- *H04B 10/079* (2013.01)
- *H04J 14/02* (2006.01)

(52) U.S. Cl.
CPC .......... *H04B 10/07* (2013.01); *H04B 10/07957* (2013.01); *H04J 14/025* (2013.01); *H04J 14/0246* (2013.01); *H04J 14/0256* (2013.01); *H04J 14/0257* (2013.01); *H04J 14/0258* (2013.01)

(58) Field of Classification Search
CPC ........................... H04B 10/07; H04B 10/0731
See application file for complete search history.

(56) References Cited

U.S. PATENT DOCUMENTS

| | | | |
|---|---|---|---|
| 2011/0211834 A1* | 9/2011 | Ansari et al. | 398/58 |
| 2011/0255054 A1* | 10/2011 | Hacker et al. | 351/211 |
| 2012/0008958 A1* | 1/2012 | Dahlfort et al. | 398/85 |
| 2012/0230354 A1* | 9/2012 | Huber et al. | 372/6 |

FOREIGN PATENT DOCUMENTS

| | | |
|---|---|---|
| KR | 10-0343070 | 6/2002 |
| KR | 10-0701121 B1 | 3/2007 |

OTHER PUBLICATIONS

Hezi Joseph et al., "A Novel Self-Heterodyne Method for Combined Temporal and Spectral High-Resolution Measurement of Wavelength Transients in Tunable Lasers", IEEE Photonics Technology Letters, vol. 16, No. 8, Aug. 2004, pp. 1921-1923.

* cited by examiner

Primary Examiner — Daniel Dobson
(74) Attorney, Agent, or Firm — Rabin & Berdo, P.C.

(57) ABSTRACT

A wavelength tuning time measurement apparatus and method for a multi-wavelength passive optical network (MW PON) are provided. The wavelength tuning time measurement apparatus for measuring a wavelength tuning time of a wavelength-variable light source included in the MW PON system includes an optical filter configured to pass only light of a certain wavelength bandwidth and a photo detector configured to sense light passing through the optical filter. The wavelength tuning time is a time taken from a time when a wavelength change signal is transferred to the wavelength-variable light source, to a time when light starts to be successively sensed by the photo detector.

17 Claims, 6 Drawing Sheets

WAVELENGTH TUNING TIME MEASUREMENT APPARATUS AND METHOD FOR MULTI-WAVELENGTH PASSIVE OPTICAL NETWORK

CROSS-REFERENCE TO RELATED APPLICATION

This application claims priorities from Korean Patent Applications No. 10-2012-0041782, filed on Apr. 20, 2012, 10-2012-0041792, filed on Apr. 20, 2012 and 10-2013-0043186, filed on Apr. 18, 2013, in the Korean Intellectual Property Office, the disclosures of which are incorporated herein by references in their entirety.

BACKGROUND

1. Field

The following description relates to a passive optical network (PON), and more particularly, to a wavelength tuning time measurement apparatus and method in a multi-wavelength passive optical network (MW PON).

2. Description of the Related Art

As optical communication technology is advanced and the demand for the Internet service increases rapidly, fundamental research on an optical access network has been conducted since the early 2000s, and thus introduction of a broadband convergence network (which directly connects an office or a central office (CO) to subscribers through an optical fiber) such as fiber to the home (FTTH) and fiber to the office (FTTO) is generalized. Herewith, research on next generation super high-speed large-scale optical access network technology is being actively done for responding to an explosive increase in traffic due to the spread of mobile Internet protocol (IP) terminals such as smartphones or tablet computers, the commercialization of an IP television (IPTV) service, and the spread of a multimedia broadcast/streaming service over the Internet.

As a method for efficiently providing a service to more subscribers with limited network resources, a time division multiplexing (TDM) technique and a wavelength division multiplexing (WDM) technique are being applied to optical access network technology. Recently, research is being done on an optical access network using a hybrid technique in which both the TDM technique and the WDM technique are applied. Attempts to apply an orthogonal frequency division multiplexing (OFDM) technique (which is mainly used in wireless communication at present) to the optical access network technology are also being actively made, which is an example of the hybrid technique in a broad sense.

Among the techniques, the WDM technique or the hybrid technique may perform communication using a plurality of wavelength bands, namely, a multi-wavelength. As the use of the Internet increases and demand for multimedia contents increases explosively, increasing a bandwidth of a network in a wired optical access network and a wireless network or a merged wired/wireless network thereof is becoming an increasingly important issue, and particularly, a technique using a multi-wavelength is attracting an attention as a type of method for solving the important issue. According to this, it is possible not only to provide a super high-speed communication service to many subscribers, but also to easily expand a communication capacity and the number of subscribers with an excellent communication security. Therefore, in the next generation super high-speed large-scale optical access network technology, an MW PON using the WDM technique or the hybrid technique is obtaining a great interest.

An MW PON system may include a service provider unit (hereinafter referred to as "an optical line terminal (OLT)") installed in a CO, a user terminal unit or a number of subscriber units (hereinafter referred to as "an optical network unit (ONU)") neighboring thereto, and a local node in which one or more optical multiplexers/de-multiplexers or light intensity splitters are installed or an optical distribution network (hereinafter referred to as "an optical distribution unit (ODN)"). In the MW PON system, a network configuration may be varied depending on the kind of used light source, for example, a spectrum-split light source, a wavelength-locked light source, or a wavelength-independent light source. Further, a wavelength of light used in the MW PON system may be fixed between an OLT and a specific ONU, or varied.

Active research on the use of a wavelength-variable light source is being done for efficiently utilizing wavelength resources in the MW PON, for example, a hybrid PON or a WDM PON using a wavelength multiplexing scheme. Using the wavelength-variable light source, it is possible to solve a problem caused by the production, installation, and management of light sources for each wavelength. In addition, it is possible to provide an efficient and user-convenient service in which load balancing is made by dynamically allocating a wavelength, or when a link is congested, a new link is established by quickly changing a current wavelength to another wavelength.

A wavelength varying operation or a wavelength tuning operation, in which a wavelength-variable light source stably generates light of a wavelength different from the original wavelength, is needed for communication between an OLT and each of ONUs using the wavelength-variable light source. Further, in the MW PON system, a wavelength tuning time may be changed depending on a mechanism, in which a wavelength is changed in the wavelength tuning operation, or a wavelength interval between channels to be changed. Therefore, the wavelength tuning time of the wavelength-variable light source should be importantly considered in a link establishment procedure of changing the existing wavelength to a new wavelength between the OLT and the ONU. Especially, in terms of the MW PON system in which an ODN includes a light intensity splitter instead of multiplexers for each wavelength, when the wavelength tuning time of the wavelength-variable light source is not sufficiently considered, the wavelength-variable light source operates in a state in which a wavelength is not completely changed, and can affect a channel of other wavelength. For this reason, an apparatus and a procedure are required for clearly defining the wavelength tuning time of the wavelength-variable light source and measuring the wavelength tuning time according thereto.

SUMMARY

The following description relates to a wavelength tuning time measurement apparatus and method for measuring a wavelength varying time of a wavelength-variable light source when it is required to change an output wavelength of the wavelength-variable light source included in an MW PON.

In one general aspect, an apparatus for measuring a wavelength tuning time of a wavelength-variable light source, included in a multi-wavelength passive optical network (MW PON) system, includes: an optical filter configured to pass only light of a certain wavelength bandwidth; and a photo detector configured to sense light passing through the optical filter, wherein the wavelength tuning time is a time taken from a time when a wavelength change signal is transferred to the wavelength-variable light source, to a time when light starts to be successively sensed by the photo detector. A center of the certain wavelength bandwidth may match a central wavelength of an ITU-T channel grid.

A pass bandwidth of the optical filter may correspond to a channel wavelength range that is a wavelength range requiring an operation based on a performance required by the MW PON system.

The pass bandwidth of the optical filter may correspond to a channel frequency range that is a frequency range requiring an operation based on a performance required by the MW PON system.

The pass bandwidth of the optical filter may correspond to a maximum tunable spectral excursion.

The optical filter may be a multilayer thin film filter, a chirped optical waveguide Bragg grating filter, a chirped optical fiber Bragg grating filter, or an arrayed waveguide grating (AWG) filter.

A central wavelength of the optical filter may match an ITU-T channel grid. Further, the central wavelength of the optical filter may be changed.

The wavelength tuning time may be used for a link establishment process or link change process between a service provider unit and subscriber unit of the MW PON system. For example, the wavelength tuning time may be used for a case that moves to a newly allocated wavelength channel in the middle of activating an ONU of the MW PON system or subsequently to the activation. For another example, the wavelength tuning time may be used for a case in which, in the MW PON system including a plurality of OLTs, an operation of some OLTs is stopped for operating in a power save mode and ONUs connected thereto move to a wavelength channel to be communicable with other operating OLT. For another example, the wavelength tuning time may be used for a case that desires to dynamically allocate a wavelength resource in the MW PON system or a case that desires to check a performance such as an output wavelength of the wavelength-variable light source being drifted or being well maintained within a predetermined grid.

In another general aspect, a method of measuring a wavelength tuning time of a wavelength-variable light source, included in a multi-wavelength passive optical network (MW PON) system, includes: changing a wavelength of light generated from the wavelength-variable light source; sensing light passing through an optical filter that passes only light of a certain wavelength bandwidth; and calculating, as the wavelength tuning time, a time taken from a time when a wavelength change signal is transferred to the wavelength-variable light source, to a time when light starts to be successively sensed in the sensing of light.

A pass bandwidth of the optical filter may correspond to a channel wavelength range that is a wavelength range requiring an operation based on a performance required by the MW PON system.

The pass bandwidth of the optical filter may correspond to a channel frequency range that is a frequency range requiring an operation based on a performance required by the MW PON system.

The pass bandwidth of the optical filter may correspond to a maximum tunable spectral excursion.

The optical filter may be a multilayer thin film filter, a chirped optical waveguide Bragg grating filter, a chirped optical fiber Bragg grating filter, or an arrayed waveguide grating (AWG) filter.

A central wavelength of the optical filter may match an ITU-T channel grid. Further, the central wavelength of the optical filter may be changed.

The wavelength tuning time may be used for a link establishment process or link change process between a service provider unit and subscriber unit of the MW PON system. For example, the wavelength tuning time may be used for a case that moves to a newly allocated wavelength channel in the middle of activating an ONU of the MW PON system or subsequently to the activation. For another example, the wavelength tuning time may be used for a case in which, in the MW PON system including a plurality of OLTs, an operation of some OLTs is stopped for operating in a power save mode and ONUs connected thereto move to a wavelength channel to be communicable with other operating OLT. For another example, the wavelength tuning time may be used for a case that desires to dynamically allocate a wavelength resource in the MW PON system or a case that desires to check a performance such as an output wavelength of the wavelength-variable light source being drifted or being well maintained within a predetermined grid.

According to another aspect of the present invention, the method may further include, before the changing of a wavelength of the wavelength-variable light source, checking whether the central wavelength of the optical filter is tuned to a central wavelength of a target channel to be changed.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

A below-described wavelength tuning time measurement apparatus or method according to an embodiment of the present invention may be applied to measure a wavelength varying time or wavelength tuning time of a wavelength-variable light source used in an MW PON system. The wavelength-variable light source is a light source capable of generating light of different wavelengths, and the MW PON system may be used not only for a WDM PON system but also for a hybrid PON system (for example, a TWDM PON system or an OFDM PON system) in which a TDM technique and a WDM technique are merged. The wavelength tuning time in the MW PON system denotes a time taken until light generated from the wavelength-variable light source is stabilized to thereby have a wavelength within a desired range when a wavelength of previously generated light is changed and light of other wavelength starts to be generated. Here, the wavelength within the desired range may be a wavelength range in which a central wavelength is tuned to an ITU-T channel grid.

Changing a wavelength of the wavelength-variable light source in the MW PON system may be required for various cases. For example, changing the wavelength of the wavelength-variable light source may be necessary in a case that moves to a newly allocated wavelength channel in the middle of activating an ONU of the MW PON system or subsequently to the activation. For another example, in the MW PON system including a plurality of OLTs, changing the wavelength of the wavelength-variable light source may be necessary when an operation of some OLTs is stopped for operating in a power save mode, and ONUs connected thereto move to a wavelength channel to be communicable with other operating OLT. For another example, changing the wavelength of the wavelength-variable light source may be necessary when desiring to dynamically allocate a wavelength resource in the MW PON system or when desiring to check a performance such as an output wavelength of the wavelength-variable light source being drifted or being well maintained within a predetermined grid.

A wavelength varying process in the MW PON system may be subdivided into the following processes. For example, the wavelength varying process may include a process in which the wavelength-variable light source of the ONU receives a wavelength variation command from the OLT using a PLOAM or OMCI channel, a process in which a wavelength is changed, and a process in which a predetermined subsequent procedure is performed after changing the wavelength is completed.

A wavelength tuning process of the wavelength-variable light source may be changed depending on a kind or configuration of the MW PON, but may be performed in several cases. For example, an ONU newly activated in an activation process of the ONU (more specifically, the wavelength-variable light source included in the ONU) may need tuning of a wavelength to a certain allocated wavelength. Further, even when the existing allocated wavelength is changed to other wavelength after the ONU is activated, the ONU may need tuning of a wavelength to a newly allocated wavelength. Changing an allocated wavelength is performed for a manager of a network system managing wavelength resources, or performed for enhancing a performance through load balancing of the network system, but is not limited thereto.

The MW PON including the wavelength-variable light source may be used for various types of networks as well as the existing optical communication network. As an example thereof, the MW PON system is used as a backbone network for a split type wireless base station. In the split type wireless base station, a remote controller (REC) and a remote end (RE) are split from each other and installed. The REC processes a digital baseband signal and controls and manages a wireless base station, and the RE performs filtering, modulation, frequency conversion, and amplification on an analog radio frequency (RF) signal, and transmits/receives the analog RF signal through an antenna. In the split type wireless base station, only the RE is installed inside a cell, and the REC is installed in a central office, thus enabling an efficient cell operation. Further, one or more RECs and a plurality of the REs may be network-configured as an MW PON. Hereinafter, an architecture of the MW PON will be first described briefly.

Figure 1A:
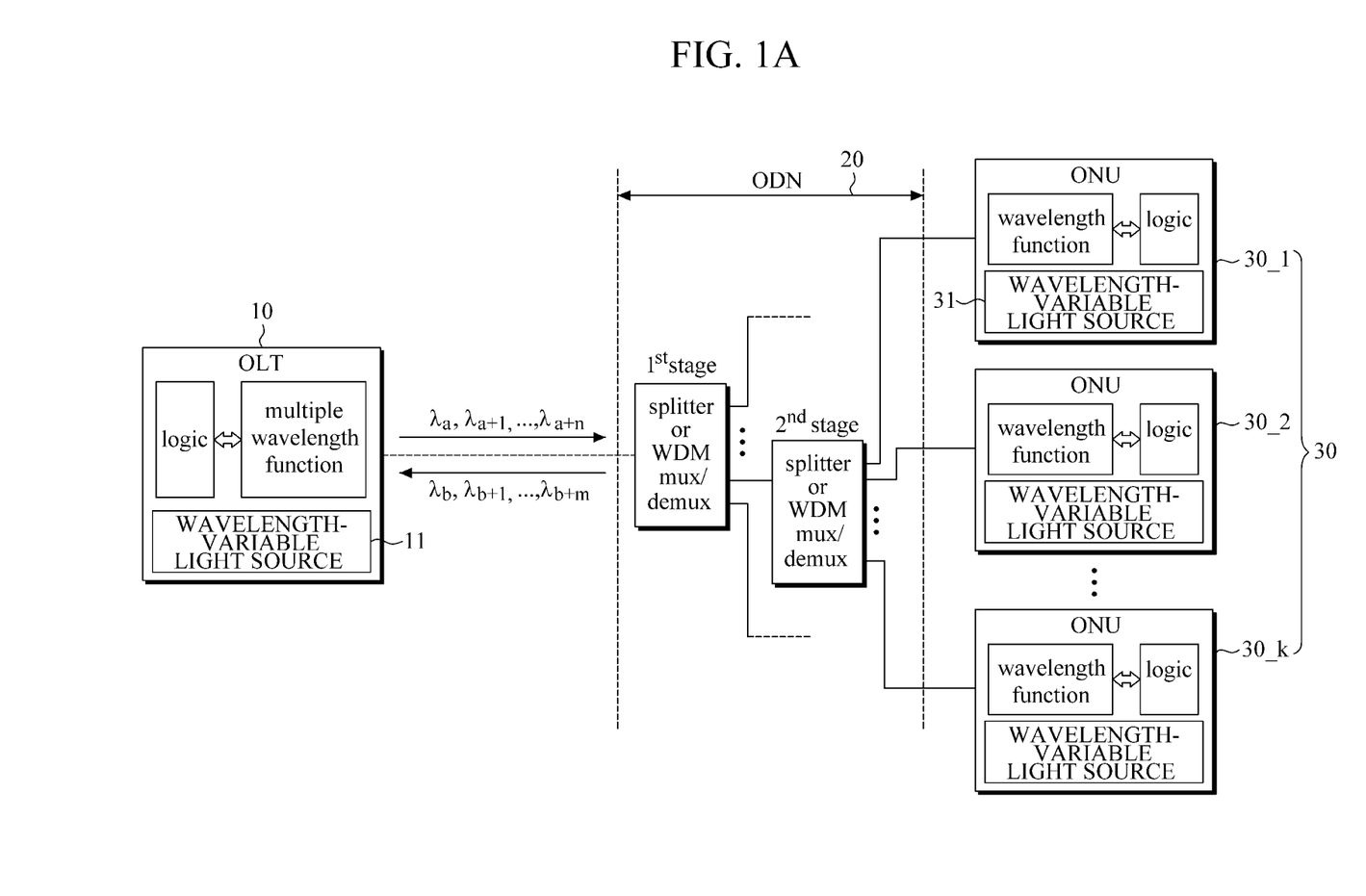
FIG. 1A is a block diagram illustrating an example of an MW PON system including a wavelength-variable light source.
Figure 1B:
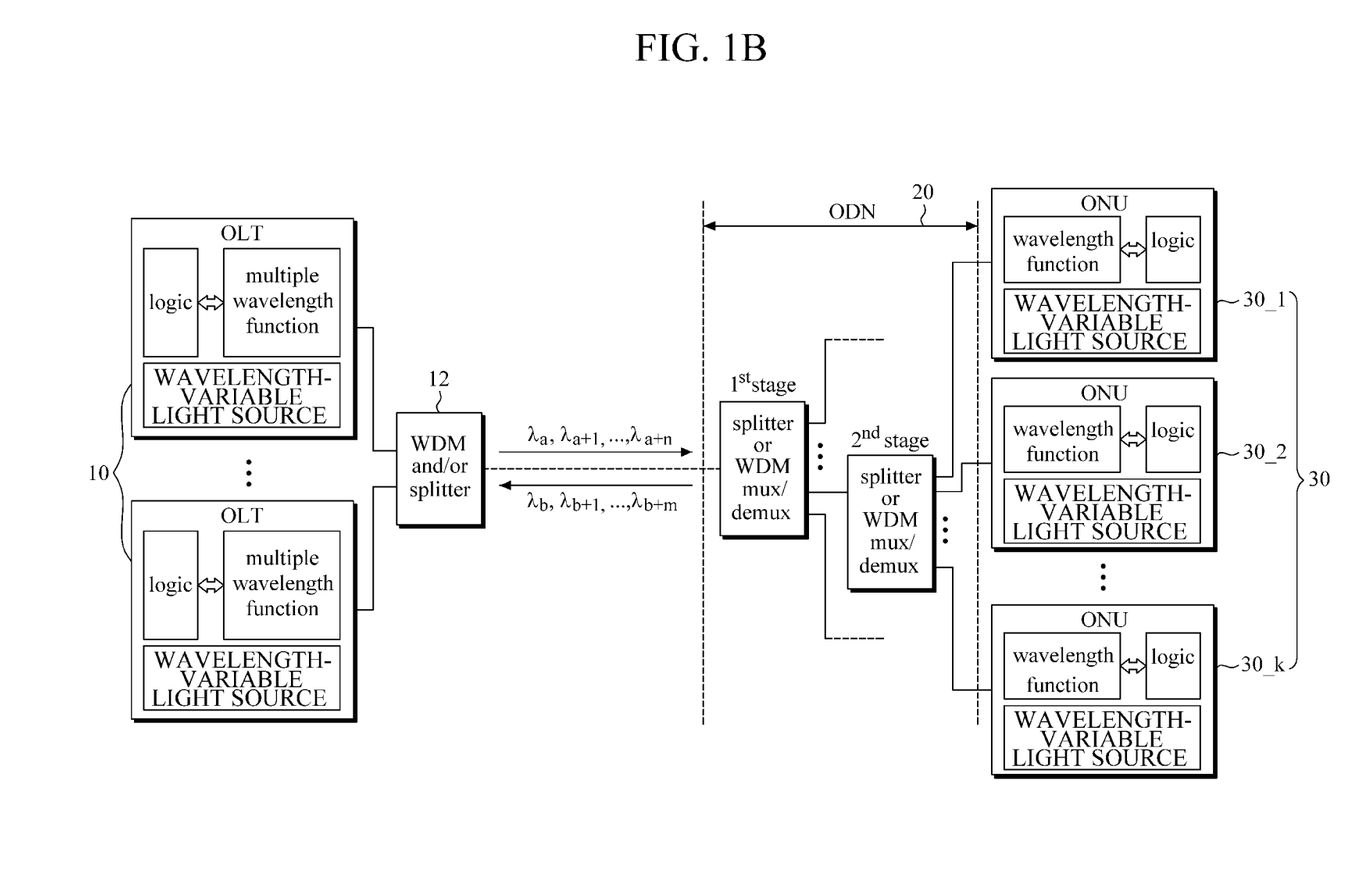
FIG. 1B is a block diagram illustrating another example of an MW PON system including a wavelength-variable light source.

FIG. 1A is a block diagram illustrating an example of the MW PON system including the wavelength-variable light source, and FIG. 1B is a block diagram illustrating another example of the MW PON system including the wavelength-variable light source. A difference between FIGS. 1A and 1B is that the number of service provider units such as an OLT 10 is one (FIG. 1A) or in plurality (FIG. 1B), and thus, the system of FIG. 1B further includes a WDM unit 12 connected to a plurality of the OLTs 10 installed in a central office. Further, each of the OLTs 10 may include a wavelength-variable light source 1, and an ONU 30 that is a subscriber unit may include a wavelength-variable light source 31. In FIGS. 1A and 1B, for convenience of illustration, each of elements is illustrated as a functional block.

The MW PON systems of FIGS. 1A and 1B are WDM PON systems in which a plurality of subscriber units, namely, a plurality of the ONUs 30, do not share a wavelength, systems in which a plurality of TDM PON systems are stacked on one OLT and different wavelengths are allocated to the respective TDM PON systems, or stacked TDM PON systems for each wavelength for supporting traffic load balancing through dynamic wavelength tuning. Alternatively, the MW PON system may be a hybrid PON system in which all characteristics or some characteristics of the above-described systems are merged. In the MW PON system, the ONUs 30 may be classified as one of a plurality of grades on the basis of tunability and/or wavelength tuning speed of the ONUs.

Referring to FIGS. 1A and 1B, the MW PON system includes the OLT 10, an ODN 20, and the ONUs 30. The OLT 10 corresponds to a service provider unit, the ODN 20 corresponds to a local node or an optical distribution network, and the each of the ONUs 30 corresponds to a subscriber unit. One or more OLTs 10 are located in a central office (CO), transmit downlink data $(\lambda_a, \lambda_{a+1}, \ldots, \text{and } \lambda_{a+n})$ from each of the ONUs 30, and receives uplink data $(\lambda_b, \lambda_{b+1}, \ldots, \text{and } \lambda_{b+m})$ from each of the ONUs 30.

Further, the OLTs 10 of the MW PON system may include the wavelength-variable light source 1, and the ONUs 30 of the MW PON system may include the wavelength-variable light source 31. For example, the wavelength-variable light sources 11 and 31 may be respectively included in the OLT 10 and/or the plurality of ONUs 30. In the embodiment, the kind of wavelength-variable light source is not limited, and may be changed depending on the kind of MW PON system. Using the wavelength-variable light source, it is possible to solve a problem caused by the production, installation, and management of light sources for each wavelength, and moreover, it is possible to provide an efficient and user-convenient service in which load balancing is made by dynamically allocating a wavelength, or when a specific link is congested, smooth communication can be made by quickly changing wavelength.

Each of the ONUs 30 exchanges the downlink data and the uplink data with the OLT 10 using a unique wavelength allocated thereto. The ONUs 30 may transmit data within only an allocated transmission time depending on the kind of MW PON system, and the embodiment is not limited thereto.

The ODN 20 includes one or more splitters or a WDM multiplexer/de-multiplexer, and separates/de-multiplexes a downstream (transmitted from the OLT 10) for each wavelength to transfer the separated/de-multiplexed downstream to the ONUs 30_1, 30_2, . . . , 30_k, or combines/multiplexes an upstream received from the ONUs 30_1, 30_2, . . . , 30_k to transfer the combined/multiplexed upstream to the OLT 10. The separating/de-multiplexing process and the combining/multiplexing process may be divided into a plurality of stages depending on the is number of splitters or optical multiplexers/de-multiplexers. In FIGS. 1A and 1B, reference numeral $IF_{PON}$ refers to an interface of a PON, and the embodiment is not limited thereto.

In the MW PON systems of FIGS. 1A and 1B, a process of establishing a link between the OLT 10 and the ONUs 30_1, 30_2, . . . , 30_k is needed for exchanging data between the one or more OLTs 10 and the plurality of ONUs 30. The process of establishing the link may use the PLOAM or OMCI channel, or may be subdivided into a process of initializing a wavelength used by each of the ONUs 30_1, 30_2, . . . , 30_k and a process of allocating the wavelength used by each of the ONUs 30_1, 30_2, . . . , 30_k when again described in terms of the OLT 10. In the MW PON system including the wavelength-variable light sources 11 and 31, the link establishing process includes a wavelength tuning process (a time expended according thereto) of the wavelength-variable light sources 11 and 31.

In the MW PON system including the splitter-based ODN 20, an ONU (for example, the ONU 30_k) newly installed in the system may operate only when an initial wavelength is allocated thereto. The initial wavelength may include a wavelength for downstream and a wavelength for upstream. A procedure of allocating the initial wavelength, namely, a wavelength initialization procedure, may be essential to activate the ONU 30_k. When the new ONU 30_k is installed in the ODN 20, the initial downstream wavelength and upstream wavelength should be automatically allocated with a certain interval between the OLT 10 and the new ONU 30_k. The wavelength allocating process may be executed as a portion of the activation of the ONU 30_k. In order for the new ONU 30_k to appropriately communicate with the OLT 10, a downstream wavelength and upstream wavelength for the new ONU 30_k should be designated as quickly as possible, and wavelength tuning may be needed when the new ONU 30_k is activated. In the MW PON system including the ODN 20 based on arrayed waveguide grating (AWG), the ODN 20 may pass only one wavelength from the OLT 10 to the ONUs 30 or from the ONUs 30 to the OLT 10. In this case, wavelength allocation may be performed when a physical installation process is being performed.

In the MW PON system, some wavelengths are in an idle state when traffic is small or intense, and in other wavelengths, when a great load is applied, load balancing for varying all or some of ONUs allocated with the wavelength with the load applied thereto may be an example of changing the wavelength allocated to the ONUs. According to this, traffic is balanced between available wavelengths, and a PON operation can be maintained in a stable state. Alternatively, although most of wavelengths are used in the MW PON system, when traffic is small in each wavelength, the MW PON system can be efficiently operated by reducing the number of used wavelengths. In this case, an arbitrary port of the OLT 10 is turned off, and by varying the ONU 10 to a subset of available wavelengths, power of the OLT 10 can be saved.

A link establishment or reestablishment process in the MW PON system includes the wavelength tuning process that is a process in which the OLT or ONU including the wavelength-variable light source generates light, and the light stably erupts at a certain allocated wavelength. Wavelength tuning or wavelength variation of the wavelength-variable light source includes erupting light of a wavelength allocated to the ONU and changing a wavelength of light erupting at a newly allocated wavelength, in the link establishment process in the MW PON system. To this end, the wavelength-variable light source or a wavelength-variable light transceiver (OTRx) may be mounted on the ONU and/or OLT of the MW PON system.

In the wavelength tuning process, a wavelength tuning time may be changed depending on the kind, characteristic, or grade of wavelength-variable light source. Therefore, the wavelength tuning time of the wavelength-variable light source included in a corresponding MW PON system should be considered in a link establishment process between the OLT and the ONU. That is, for a wavelength-variable laser to be used in the MW PON system, in which a wavelength is frequently varied by wavelength dynamic allocation, the wavelength tuning time may be a very important performance parameter. For example, in the MW PON system, the ONUs may be classified as a plurality of grades depending on the wavelength tuning speed or the wavelength tuning time. The wavelength tuning time may be changed according to a measurement method, and thus, an integrated method of measuring the wavelength tuning time and an apparatus realizing the same are needed for the wavelength-variable light source. Further, the wavelength tuning time of the wavelength-variable light source should satisfy a time required by the MW PON system.

Figure 2:
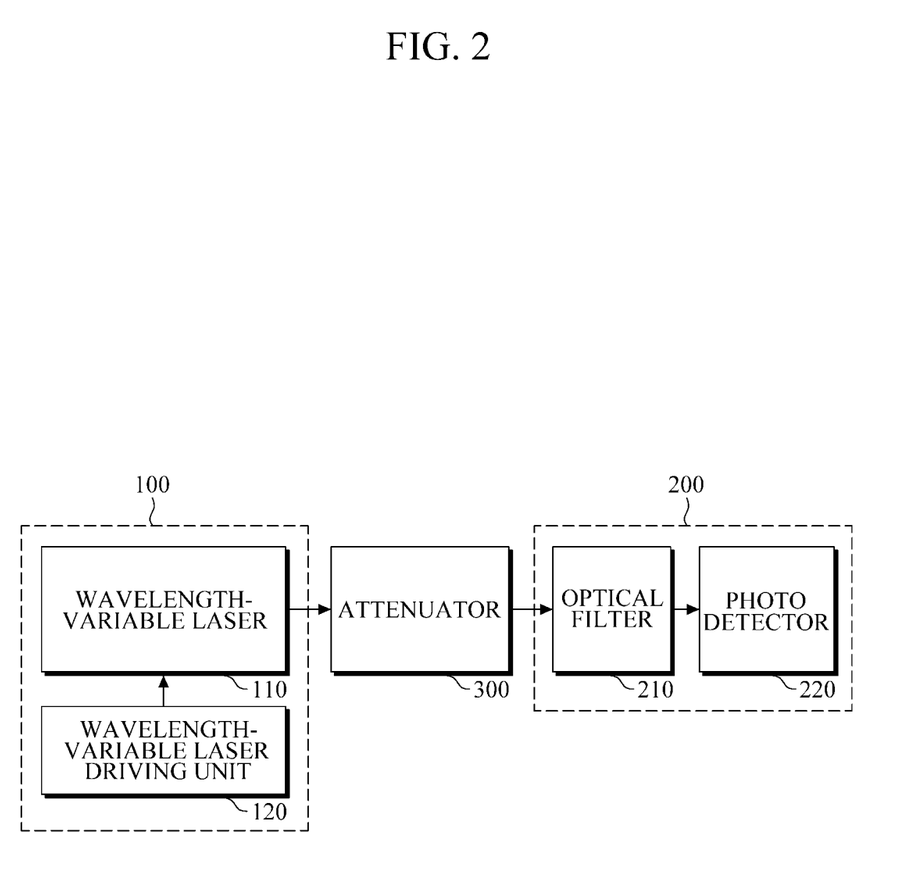
FIG. 2 is a block diagram illustrating an example of a configuration of a wavelength-variable light source included in the MW PON system and an apparatus for measuring a wavelength tuning time of the wavelength-variable light source.
Figure 3:
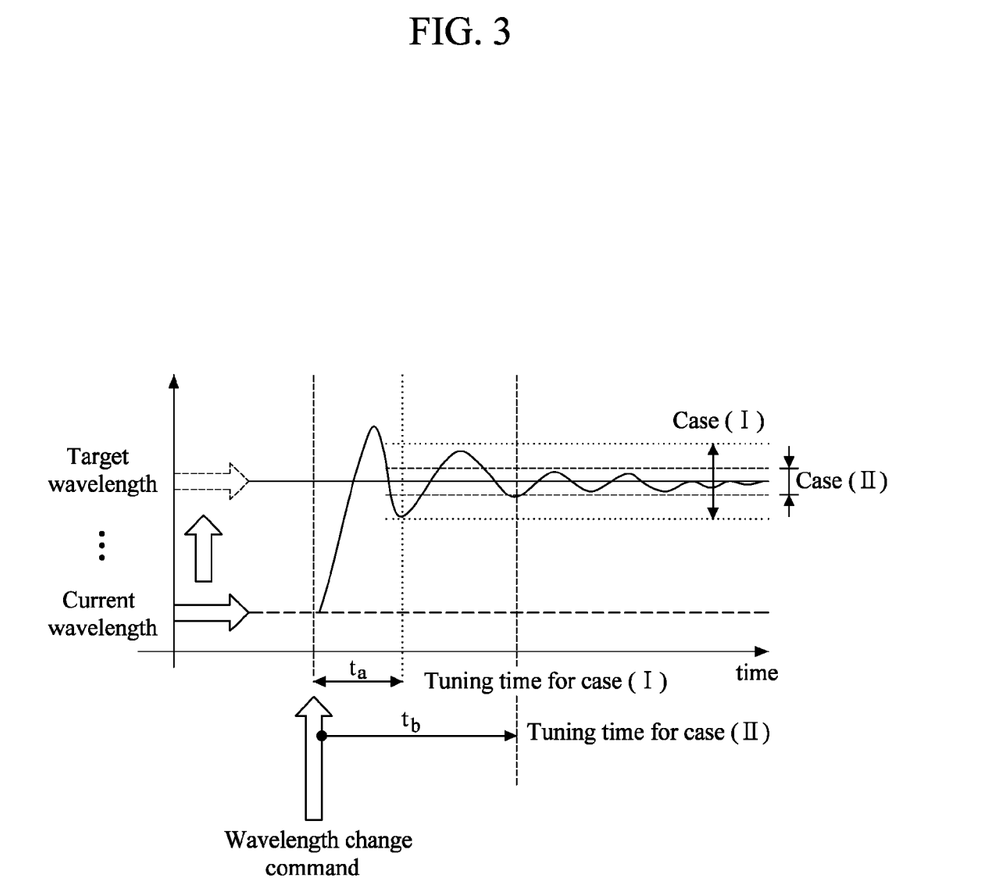
FIG. 3 is a diagram illustrating one principle for measuring a wavelength tuning time in the wavelength tuning time measurement apparatus of FIG. 2.
Figure 4:
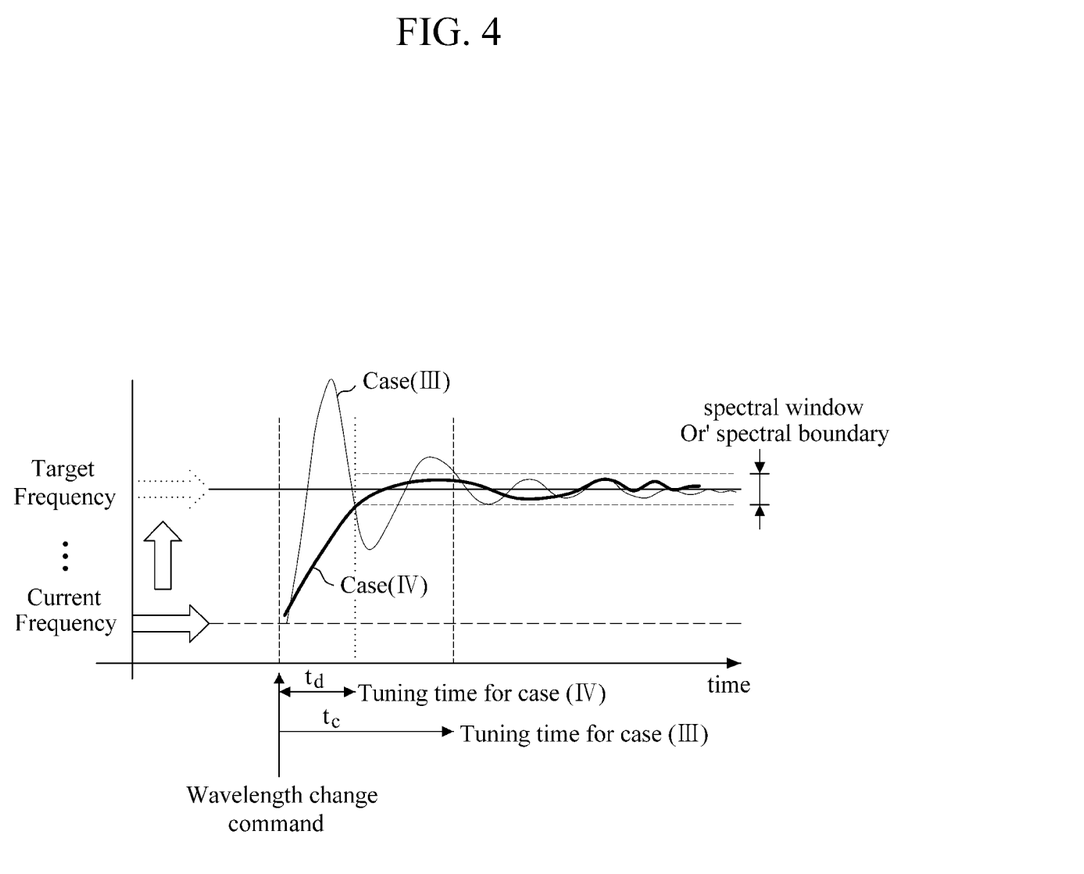
FIG. 4 is a diagram illustrating another principle for measuring the wavelength tuning time in the wavelength tuning time measurement apparatus of FIG. 2.

FIG. 2 is a block diagram illustrating an example of a configuration of the wavelength-variable light source included in the MW PON system of FIG. 1A or 1B and an apparatus for measuring a wavelength tuning time of the wavelength-variable light source. In FIG. 2, reference numeral 100 corresponds to the wavelength-variable light source, reference numeral 200 corresponds to the wavelength tuning time measurement apparatus, and reference numeral 300 corresponds to an attenuator. Here, the attenuator 300 is an arbitrary element, and when a light intensity of the wavelength-variable light source 100 is too great, the attenuator 300 prevents an overload of an O/E converter or a photo detector of the wavelength tuning time measurement apparatus 200 by reducing the light intensity. Further, FIGS. 3 and 4 are diagrams illustrating the principle for measuring a wavelength tuning time in the wavelength tuning time measurement apparatus 200.

Referring to FIG. 2, the wavelength-variable light source 100 may include a wavelength-variable laser 110 and a wavelength-variable laser driving unit 120.

The wavelength-variable laser 110 is a means for generating light of a wavelength (or a frequency) within various ranges, and in the embodiment, the kind of wavelength-variable laser is not limited. The wavelength-variable laser 110 may generate light of a certain wavelength (or a frequency) within a range necessary for the MW PON system (see FIG. 1A or FIG. 1B) including at least the wavelength-variable light sources 11 and 31. Further, the wavelength-variable laser 110 may generate light of a certain wavelength (or a frequency) or change a wavelength (or a frequency) of previously generated light to generate light according to control by the wavelength-variable laser driving unit 120.

The wavelength-variable laser driving unit 120 is a means for driving the wavelength-variable laser 110, and a detailed configuration thereof is not limited. The wavelength-variable laser driving unit 120 may add information on a wavelength (or a frequency) of light, generated by the wavelength-variable laser 110, into a wavelength (or a frequency) change signal, and transfer the wavelength change signal to the wavelength-variable laser 110. Further, when the wavelength change signal is received from the wavelength-variable laser driving unit 120, the wavelength-variable laser 110 may generate light of a certain wavelength according to wavelength information included in the wavelength change signal. When a wavelength (or a frequency) change signal including wavelength (or a frequency) information indicating a second wavelength (or a frequency) is received while light is being generated at a first wavelength (or a frequency), the wavelength-variable laser 110 may change a wavelength (or a frequency) of generated light from the first wavelength (or a frequency) to the second wavelength (or a frequency).

The wavelength tuning time measurement apparatus 200 is an apparatus for measuring a wavelength tuning time of the wavelength-variable light source 100. The wavelength tuning time denotes a time taken until a wavelength of light, output from the wavelength-variable light source 100, enters a certain bandwidth range and is stabilized from a time when a light generation command or a wavelength change command is generated. Here, the certain bandwidth range may denote a channel wavelength range. The channel wavelength range corresponds to each of a plurality to channels of the MW PON system, and a value thereof may be decided according to a requiring condition of the MW PON system. The wavelength tuning time measurement apparatus 200 may include an optical filter 210 and a photo detector 220. However, aspects of the present invention are not limited thereto, such that the wavelength tuning time measurement apparatus 200 may include an 0/E converter with fourth-order Thomson filter and a waveform monitor, instead of the photo detector 220.

The optical filter 210 passes only light of a certain bandwidth, namely, light within a channel wavelength range. The light of the certain bandwidth denotes light whose central wavelength matches a specific ITU-T channel grid. Further, the channel wavelength range that is a pass bandwidth of the optical filter 210 corresponds to a wavelength range included in the maximum acceptable difference with respect to a nominal central frequency of a channel, and may indicate the maximum tunable spectral excursion. The maximum tunable spectral excursion indicates the total maximum allowable excursion from spectral width, tuning granularity, and short-term wavelength drift.

According to this, the optical filter 210 is a means that passes light within a range of the maximum tunable spectral excursion. Alternatively, a pass bandwidth of the optical filter 210 may correspond to a channel frequency range that is a frequency range requiring an operation based on a performance required by the MW PON system.

The optical filter 210 may be a multilayer thin film filter, a chirped optical waveguide Bragg grating filter, a chirped optical fiber Bragg grating filter, or an AWG filter. A central frequency of the optical filter 210 may match the ITU-T channel grid, and may be changed.

The photo detector 220 is a means for detecting light passing through the optical filter 210. That is, among light generated by the wavelength-variable light source 100, only light passing through the optical filter 210 reaches the photo detector 220, which detects light that passes through the optical filter 210 and reaches the photo detector 220. The detailed kind of photo detector 220 is not limited, and a means for detecting whether light is received irrespective of a wavelength may be sufficiently used as the photo detector 220.

The photo detector 220 may generate information on a time when light passing through the optical filter 210 successively reaches the photo detector 220, or calculate a wavelength tuning time using the generated information. That is, even when light is intermittently or temporarily received after the wavelength change command, the photo detector 220 does not use the intermittent or temporary receiving of light for calculation of the wavelength tuning time. This is because the photo detector 220 can detect light temporarily passing through the optical filter 210 before light generated from the wavelength-variable light source 100 is stabilized (see FIGS. 3 and 4).

According to an aspect of the embodiment, only a value directly calculated by the photo detector 220 may be output as the wavelength tuning time. In this case, the photo detector 220 may decide, as the wavelength tuning time, a time from a time (at which a wavelength change signal is input) to a time when light passing through the optical filter 210 is stably sensed (where, the wavelength change signal may be transferred from the wavelength-variable light source 100, particularly, the wavelength-variable laser driving unit 120, to the wavelength tuning time measurement apparatus 200, but is not limited thereto. For example, the wavelength tuning time measurement apparatus 200 includes a separate controller (not shown), the wavelength change signal from the controller may be transferred to the photo detector 220 and the wavelength-variable laser driving unit 120).

On the other hand, the photo detector 220 may output only information on a time when light passing through the optical filter 210 starts to be stably sensed. In this case, the separate controller included in the wavelength tuning time measurement apparatus 200 may calculate the wavelength tuning time. Here, it is obvious to those skilled in the art that the information on a time when the wavelength change signal is generated is not required to be transferred to the photo detector 220.

By using the wavelength tuning time measurement apparatus 200 having the configuration of FIG. 2, despite light generated from the same wavelength-variable light source 100, a measured wavelength tuning time may be changed depending on a size of the maximum tunable spectral excursion or a wavelength channel range of the optical filter 210. Hereinafter, this will be described in more detail with reference to FIGS. 3 and 4.

FIGS. 3 and 4 are graphs showing waves of light, generated from the wavelength-variable light source 100, with time when the wavelength-variable light source 100 (see FIG. 2) tunes a current wavelength to a target wavelength, FIG. 3 being a wave graph of a wavelength of generated light, and FIG. 4 being a wave graph of a frequency of the generated light. Further, FIG. 3 shows a case in which the wavelength tuning time is changed when a pass wavelength of the optical filter 210 is changed, and FIG. 4 shows a case in which the wavelength tuning time is changed when a pass frequency of the optical filter 210 is changed.

Referring to FIG. 3, a first case (case (I)) and a second case (case (II)) are cases having different pass bandwidths of the optical filter 210, and a value of the second case (case (II)) is greater than that of the first case (case (I)). According to this, a tuning time (tuning time for case (I), $t_a$) of the first case is greater than a tuning time (tuning time for case (II), $t_b$) of the second case. That is, when the pass bandwidth of the optical filter 210 is set small, the wavelength tuning time of the wavelength-variable light source 100 may become longer. This denotes that when the channel wavelength range or the maximum tunable spectral excursion is set smaller in the MW PON system, more time is expended in wavelength tuning by the wavelength-variable light source 100. Therefore, the link establishment process of the MW PON system should consider the wavelength tuning time of the wavelength-variable light source 100 based on the size of the maximum tunable spectral excursion or the channel wavelength range of the system.

Referring to FIG. 4, a third case (case (III)) and a fourth case (case (IV)) are cases having different pass frequency ranges of the optical filter 210, and a value of the fourth case (case (IV)) is greater than that of the third case (case (III)). According to this, a tuning time (tuning time for case (III), $t_c$) of the third case is greater than a tuning time (tuning time for case (IV), $t_d$) of the fourth case. That is, when the pass frequency range of the optical filter 210 is narrowly set, the wavelength tuning time of the wavelength-variable light source 100 may become longer.

Figure 5:
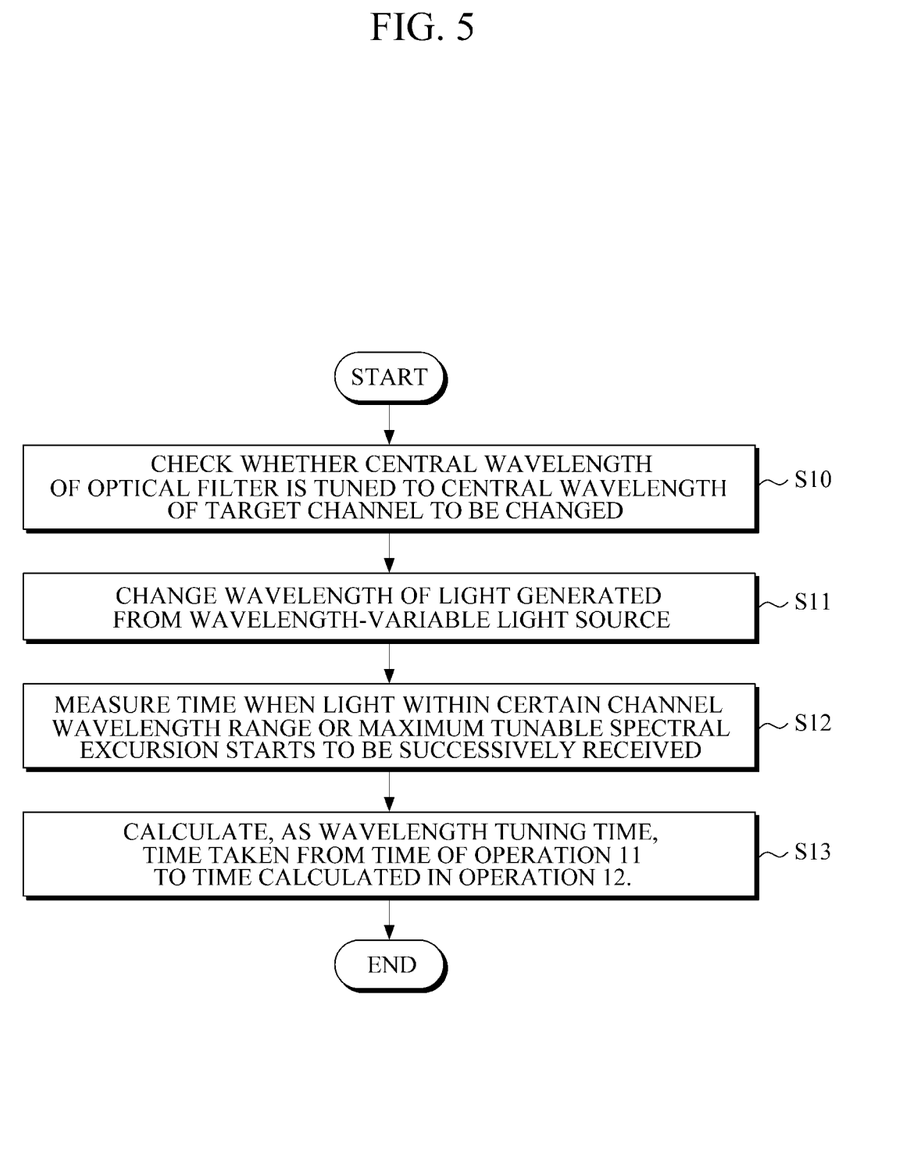
FIG. 5 is a flowchart illustrating a method of measuring a wavelength tuning time of the wavelength-variable light source included in the MW PON system according to an embodiment of the present invention.

FIG. 5 is a flowchart illustrating a method of measuring a wavelength tuning time of the wavelength-variable light source included in the MW PON system according to an embodiment of the present invention. The method illustrated in the flowchart of FIG. 5 may be performed using the wavelength-variable light source 100 and wavelength tuning time measurement apparatus 200 of FIG. 2. The wavelength tuning time may be decided according to the algorithm described above with reference to FIGS. 3 and 4. Hereinafter, a method of measuring the wavelength tuning time will be briefly described for preventing an unnecessarily repetitive description. Therefore, the details described above with reference to FIGS. 2 to 4 may be identically applied to details of the wavelength tuning time measurement method which are not specifically described below.

Referring to FIG. 5, the method checks whether a central wavelength of the optical filter 210 is tuned and set to a nominal central wavelength of a target channel to be changed in operation 10. When the central wavelength of the optical filter 210 is appropriately set, a wavelength of light generated from a wavelength-variable light source is changed in operation 11. Operation 11 may be an operation that transfers a wavelength change signal, which allows the wavelength-variable light source which generates light of a first wavelength to change the current first wavelength to a second wavelength. According to the embodiment, a main element that transfers the wavelength change signal to the wavelength-variable light source is not limited.

As a result of operation 11, the method measures a time when light within a certain channel wavelength range or the maximum tunable spectral excursion starts to be successively received in operation 12. Here, information indicating the certain channel wavelength range or the maximum tunable spectral excursion may be included in the wavelength change signal transferred in operation 11. As described above, a time is rather expended in stabilizing light generated from the wavelength-variable light source, and thus, operation 12 is for measuring a time taken in stabilization.

Subsequently, in operation 13, the method calculates a time taken from a time (at which the wavelength change signal is transferred in operation 11) to operation 12. The calculated time is a time that is necessarily considered in a link establishment procedure in which the MW PON system including the wavelength-variable light source intends to establish a new link or reestablish the existing link to a link of other wavelength. According to the embodiment, as described above, a time taken in stabilization may be changed according to the channel wavelength range or the size of the maximum tunable spectral excursion.

According to the embodiment, the wavelength tuning time of the wavelength-variable light source included in the MW PON system may be measured, and by using the measured wavelength tuning time, a wavelength-variable light source may be selected in consideration of a wavelength tuning time required by the MW PON system. Especially, by using the wavelength tuning time measurement apparatus and method according to the embodiments of the present invention, the MW PON system does not affect a channel of other wavelength when changing a wavelength of the wavelength-variable light source, and moreover, after a wavelength of the wavelength-variable light source is completely changed, communication may be performed between the ONU and the OLT.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for measuring a wavelength tuning time of a wavelength-variable light source included in a multi-wavelength passive optical network (MW PON) system, the apparatus comprising:
   an optical filter configured to pass only light of a certain wavelength bandwidth; and
   a photo detector configured to sense light passing through the optical filter, and to calculate the wavelength tuning time as a time taken from a time when a wavelength change signal is transferred to the wavelength-variable light source, to a time when light starts to be successively sensed by the photo detector.

2. The apparatus of claim 1, wherein a pass bandwidth of the optical filter corresponds to a channel wavelength range that is a wavelength range requiring an operation based on a performance required by the MW PON system.

3. The apparatus of claim 1, wherein a pass bandwidth of the optical filter corresponds to a channel frequency range that is a frequency range requiring an operation based on a performance required by the MW PON system.

4. The apparatus of claim 1, wherein a pass bandwidth of the optical filter corresponds to a maximum tunable spectral excursion.

5. The apparatus of claim 1, wherein the optical filter is a multilayer thin film filter, a chirped optical waveguide Bragg grating filter, a chirped optical fiber Bragg grating filter, or an arrayed waveguide grating (AWG) filter.

6. The apparatus of claim 1, wherein a central wavelength of the optical filter is tunable.

7. The apparatus of claim 1, wherein the wavelength tuning time is used during a link establishment process or link change process between a service provider unit and subscriber unit of the MW PON system.

8. The apparatus of claim 7, wherein the link change process is a case that moves to a newly allocated wavelength channel in the middle of activating an ONU of the MW PON system or subsequently to the activation, a case in which, in the MW PON system comprising a plurality of OLTs, an operation of some OLTs is stopped for operating in a power save mode and ONUs connected thereto move to a wavelength channel to be communicable with other operating OLT, a case that desires to dynamically allocate a wavelength resource in the MW PON system, or a case that desires to check a performance such as an output wavelength of the wavelength-variable light source being drifted or being well maintained within a predetermined grid.

9. A method of measuring a wavelength tuning time of a wavelength-variable light source included in a multi-wavelength passive optical network (MW PON) system, the method comprising:
  changing a wavelength of light generated from the wavelength-variable light source;
  sensing light passing through an optical filter that passes only light of a certain wavelength bandwidth; and
  calculating, as the wavelength tuning time, a time taken from a time when a wavelength change signal is transferred to the wavelength-variable light source, to a time when light starts to be successively sensed in the sensing of light.

10. The method of claim 9, wherein a pass bandwidth of the optical filter corresponds to a channel wavelength range that is a wavelength range requiring an operation based on a performance required by the MW PON system.

11. The method of claim 9, wherein a pass bandwidth of the optical filter corresponds to a channel frequency range that is a frequency range requiring an operation based on a performance required by the MW PON system.

12. The method of claim 9, wherein a pass bandwidth of the optical filter corresponds to a maximum tunable spectral excursion.

13. The method of claim 9, wherein the optical filter is a multilayer thin film filter, a chirped optical waveguide Bragg grating filter, a chirped optical fiber Bragg grating filter, or an arrayed waveguide grating (AWG) filter.

14. The method of claim 9, wherein a central wavelength of the optical filter is tunable.

15. The method of claim 9, wherein the wavelength tuning time is used for a link establishment process or link change process between a service provider unit and subscriber unit of the MW PON system.

16. The method of claim 15, wherein the link change process is a case that moves to a newly allocated wavelength channel in the middle of activating an ONU of the MW PON system or subsequently to the activation, a case in which, in the MW PON system comprising a plurality of OLTs, an operation of some OLTs is stopped for operating in a power save mode and ONUs connected thereto move to a wavelength channel to be communicable with other operating OLT, a case that desires to dynamically allocate a wavelength resource in the MW PON system, or a case that desires to check a performance such as an output wavelength of the wavelength-variable light source being drifted or being well maintained within a predetermined grid.

17. The method of claim 9, further comprising, before the changing of a wavelength of the wavelength-variable light source, checking whether the central wavelength of the optical filter is tuned to a central wavelength of a target channel to be changed.

* * * * *